United States Patent
Nothern, III et al.

(10) Patent No.: US 12,019,188 B2
(45) Date of Patent: Jun. 25, 2024

(54) EYE-SAFE SCANNING LIDAR WITH VIRTUAL PROTECTIVE HOUSING

(71) Applicant: Microvision, Inc., Redmond, WA (US)

(72) Inventors: Alga Lloyd Nothern, III, Seattle, WA (US); Jonathan A. Morarity, Seattle, WA (US)

(73) Assignee: Microvision, Inc., Redmond, WA (US)

( * ) Notice: Subject to any disclaimer, the term of this patent is extended or adjusted under 35 U.S.C. 154(b) by 471 days.

(21) Appl. No.: 16/806,150

(22) Filed: Mar. 2, 2020

(65) Prior Publication Data

US 2021/0270938 A1 Sep. 2, 2021

(51) Int. Cl.
G01S 7/484 (2006.01)
G01S 7/481 (2006.01)
G01S 17/931 (2020.01)

(52) U.S. Cl.
CPC ............ G01S 7/484 (2013.01); G01S 7/4817 (2013.01); G01S 17/931 (2020.01)

(58) Field of Classification Search
CPC ...... G01S 7/484; G01S 7/4817; G01S 17/931; G01S 7/4811; G01S 7/4868
USPC ................................. 356/5.01; 372/4, 29.01
See application file for complete search history.

(56) References Cited

U.S. PATENT DOCUMENTS

| | | | | |
|---|---|---|---|---|
| 4,657,382 A * | 4/1987 | Busujima | ................. | G01S 17/87 |
| 9,791,557 B1 * | 10/2017 | Wyrwas | ................. | G01S 17/42 |
| 10,488,496 B2 | 11/2019 | Campbell | | |
| 2009/0219962 A1 * | 9/2009 | Meyers | .................... | G01S 7/491 |
| | | | | 372/29.014 |
| 2009/0273770 A1 * | 11/2009 | Bauhahn | ................. | G01S 17/10 |
| | | | | 356/5.01 |
| 2013/0107000 A1 * | 5/2013 | Xue | ........................ | G01S 7/4861 |
| | | | | 348/46 |
| 2017/0176990 A1 * | 6/2017 | Keller | ...................... | G01S 17/42 |
| 2018/0088214 A1 * | 3/2018 | O'Keeffe | .............. | G01S 7/4815 |
| 2018/0284244 A1 | 10/2018 | Russell | | |
| 2018/0364356 A1 | 12/2018 | Eichenholz et al. | | |
| 2019/0064331 A1 * | 2/2019 | Russell | .................... | G01S 7/497 |
| 2019/0088814 A1 * | 3/2019 | Ueno | ..................... | H01L 31/145 |
| 2019/0323803 A1 * | 10/2019 | Jung | ......................... | F41G 1/35 |
| 2020/0003893 A1 | 1/2020 | Okada et al. | | |
| 2020/0200910 A1 * | 6/2020 | Pan | ........................ | G01S 7/4868 |

(Continued)

FOREIGN PATENT DOCUMENTS

| | | | |
|---|---|---|---|
| KR | 20180046332 | | 5/2018 |
| KR | 20180046332 A | * | 5/2018 |
| WO | WO20212081979 | | 6/2012 |

(Continued)

OTHER PUBLICATIONS

"PCT ISR and Written Opionion", Jun. 21, 2021.

(Continued)

*Primary Examiner* — Elaine Gort
*Assistant Examiner* — Ellis B. Ramirez
(74) *Attorney, Agent, or Firm* — Kevin D. Wills

(57) ABSTRACT

An eye-safe light detection and ranging system includes a virtual protective housing. A short range pulse is emitted at every measurement point in a field of view before conditionally emitting a long range pulse. Short range pulses result in accessible emissions that are eye-safe at short distances and long range pulses result in accessible emissions that are eye-safe at longer distances.

20 Claims, 12 Drawing Sheets

(56) References Cited

U.S. PATENT DOCUMENTS

2021/0325515 A1* 10/2021 Warke ..................... G01S 7/484

FOREIGN PATENT DOCUMENTS

| | | |
|---|---|---|
| WO | WO201805 2558 | 3/2018 |
| WO | WO20180052558 | 3/2018 |

OTHER PUBLICATIONS

"European Search Report", Jul. 17, 2023.
"European Search Report and Written Opinion", EP applic. No. 21763572.1,.

* cited by examiner

EYE-SAFE SCANNING LIDAR WITH VIRTUAL PROTECTIVE HOUSING

FIELD

The present invention relates generally to light detection and ranging (LIDAR) systems, and more specifically to safety of LIDAR systems.

BACKGROUND

Products that include laser devices generally fall into different laser safety classes based on the possibility that they can cause damage to the human eye or skin. International Standard IEC 60825.1 describes example laser safety classes. Although many different laser safety classes exist, one major distinction between classes is whether a product is considered "eye-safe" or "non-eye-safe." Eye-safe laser systems are generally considered to be incapable of producing damaging accessible radiation levels during operation, and are also generally exempt from device marking requirements, control measures, or other additional safety measures. IEC 60825.1 classifies eye-safe products as Class 1. Products that include high power laser devices that would otherwise be classified as non-eye-safe, may nevertheless be classified as eye-safe if the product includes additional safety measures such as a protective housing that reduces the accessible emission limits to a safe level.

DESCRIPTION OF EMBODIMENTS

Figure 1:
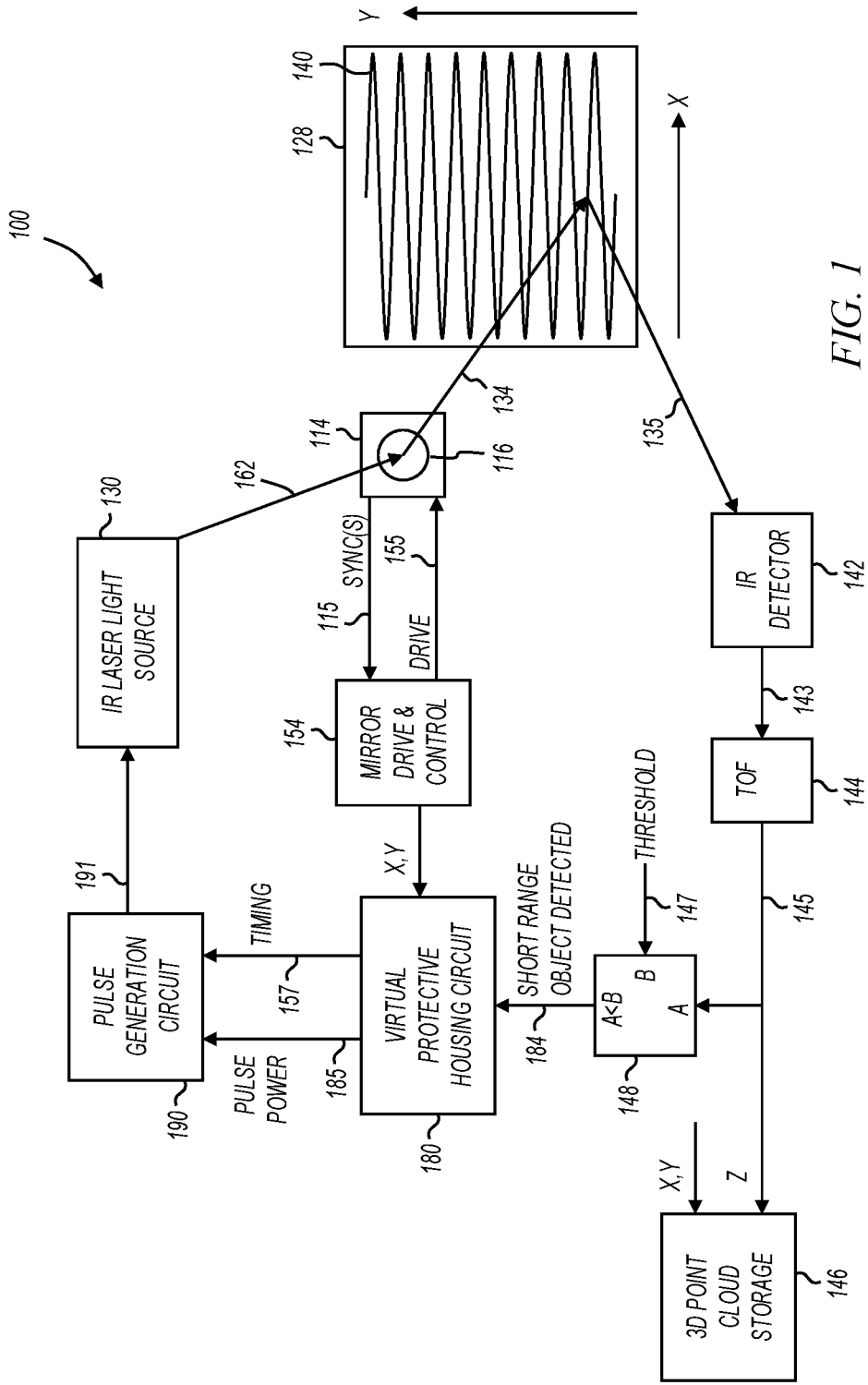
FIG. 1 shows a scanning light detection and ranging (LIDAR) system with a virtual protective housing in accordance with various embodiments of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a scanning light detection and ranging (LIDAR) system with a virtual protective housing in accordance with various embodiments of the present invention. System 100 includes pulse generation circuit 190, infrared (IR) laser light source 130, scanning mirror assembly 114 with scanning mirror 116, and mirror drive and control circuit 154. System 100 also includes infrared (IR) detector 142, time-of-flight (TOF) measurement circuit 144, 3D point cloud storage circuit 146, comparator 148, and virtual protective housing circuit 180.

Laser light source 130 may be a laser light source such as a laser diode or the like, capable of emitting a laser beam 162. The beam 162 impinges on a scanning mirror assembly 114 which in some embodiments is part of a microelectromechanical system (MEMS) based scanner or the like, and reflects off of scanning mirror 116 to generate a controlled output beam 134. In some embodiments, optical elements are included in the light path between light source 130 and mirror 116. For example, system 100 may include collimating lenses, dichroic mirrors, or any other suitable optical elements.

A scanning mirror drive and control circuit 154 provides one or more drive signal(s) 155 to control the angular motion of scanning mirror 116 to cause output beam 134 to traverse a raster scan trajectory 140 in a field of view 128. In operation, light source 130 produces modulated light pulses in the nonvisible spectrum and scanning mirror 116 reflects the light pulses as beam 134 traverses raster scan trajectory 140.

In some embodiments, raster scan trajectory 140 is formed by combining a sinusoidal component on the horizontal axis and a sawtooth component on the vertical axis. In these embodiments, controlled output beam 134 sweeps back and forth left-to-right in a sinusoidal pattern, and sweeps vertically (top-to-bottom) in a sawtooth pattern with the display blanked during flyback (bottom-to-top). FIG. 1 shows the sinusoidal pattern as the beam sweeps vertically top-to-bottom, but does not show the flyback from bottom-to-top. In other embodiments, the vertical sweep is controlled with a triangular wave such that there is no flyback. In still further embodiments, the vertical sweep is sinusoidal. The various embodiments of the present invention are not limited by the waveforms used to control the vertical and horizontal sweep or the resulting raster pattern. The vertical axis is also referred to as the slow scan axis, and the horizontal axis is also referred to as the fast-scan axis. The labels "vertical" and "horizontal" are somewhat arbitrary, since a 90 degree rotation of the apparatus will switch the horizontal and vertical axes. Accordingly, the terms "vertical" and "horizontal" are not meant to be limiting.

Although scanning mirror 116 is shown as a single mirror that scans in two dimensions, this is not a limitation of the present invention. For example, in some embodiments, mirror 116 is replaced by two mirrors, one scanning in one dimension, and a second scanning in a second dimension. Further, although system 100 is described having one or more MEMS devices to perform scanning of laser light pulses, this is not a limitation of the present invention. Any device or method for scanning light pulses along a scan path may be employed without departing from the scope of the present invention.

In some embodiments, scanning mirror 116 includes one or more sensors to detect the angular position or angular extents of the mirror deflection (in one or both dimensions). For example, in some embodiments, scanning mirror assembly 114 includes a piezoresistive sensor that delivers a voltage that is proportional to the deflection of the mirror on the fast-scan axis. Further, in some embodiments, scanning mirror assembly 114 includes an additional piezoresistive sensor that delivers a voltage that is proportional to the deflection of the mirror on the slow-scan axis. The mirror position information is provided back to mirror drive and control circuit 154 as one or more SYNC signals 115. In these embodiments, mirror drive and control circuit 154 includes one or more feedback loops to modify the drive signals in response to the measured angular deflection of the mirror. In addition, in some embodiments, mirror drive and control circuit 154 includes one or more phase lock loop circuits that estimate the instantaneous angular position of the scanning mirror based on the SYNC signals.

Mirror drive and control circuit 154 may be implemented using functional circuits such as phase lock loops (PLLs), filters, adders, multipliers, registers, processors, memory, and the like. Accordingly, mirror drive and control circuit 154 may be implemented in hardware, software, or in any combination. For example, in some embodiments, control circuit 154 is implemented in an application specific integrated circuit (ASIC). Further, in some embodiments, some of the faster data path control is performed in an ASIC and overall control is software programmable.

IR detector 142 includes one or more photosensitive devices capable of detecting reflections of IR laser light pulses. For example, IR detector 142 may include one or more PIN photodiodes, Silicon photomultipliers (SiPM), avalanche photodiodes (APD), or the like. Each point in the field of view that is illuminated with an IR laser light pulse (referred to herein as a "measurement point") may or may not reflect some amount of the incident light back to IR detector 142. If IR detector 142 detects a reflection, IR detector 142 provides a signal 143 to TOF measurement circuit 144.

TOF measurement circuit 144 measure times-of-flight (TOF) of IR laser light pulses to determine distances to objects in the field of view. In some embodiments, virtual protective housing circuit 180 provides a timing signal (not shown) corresponding to the emission time of a particular IR laser light pulse to TOF measurement circuit 144, and TOF measurement circuit 144 measures the TOF of IR laser light pulses by determining the elapsed time between the emission of the pulse and reception of the reflection of the same pulse.

TOF measurement circuit 144 may be implemented using any suitable circuits. For example, in some embodiments, TOF measurement circuit 144 includes an analog integrator that is reset when the IR pulse is launched, and is stopped when the reflected pulse is received. TOF measurement circuit 144 may also include an analog-to-digital converter to convert the analog integrator output to a digital value that corresponds to the time-of-flight (TOF) of the IR laser pulse, which in turn corresponds to the distance between system 100 and the object in the field of view from which the light pulse was reflected.

3D point cloud storage device 146 receives X, Y data from mirror drive and control circuit 154, and receives distance (Z) data on node 145 from TOF measurement circuit 144. A three-tuple (X,Y,Z) is written to 3D point cloud storage device for each detected reflection, resulting in a series of 3D points referred to herein as a "point cloud." Not every X, Y measurement point in the field of view will necessarily have a corresponding Z measurement. Accordingly, the resulting point cloud may be sparse or may be dense. The amount of data included in the 3D point cloud is not a limitation of the present invention.

3D point cloud storage device 146 may be implemented using any suitable circuit structure. For example, in some embodiments, 3D point cloud storage device 146 is implemented in a dual port memory device that can be written on one port and read on a second port. In other embodiments, 3D point cloud storage device 146 is implemented as data structures in a general purpose memory device. In still further embodiments, 3D point cloud storage device 146 is implemented in an application specific integrated circuit (ASIC).

Comparator 148 compares the distance data (Z) on node 145 to a threshold value on node 147, and if the distance is less than the threshold, then comparator 148 asserts the short range object detection signal on node 184. The short range object detection signal alerts VPH circuit 180 to the detection of an object within a "short range," where "short range" is determined by the value of the threshold on node 147. For example, if the threshold is set to a value corresponding to a distance of five meters, and the detected distance is lower than that threshold, then an object closer than five meters has been detected, and VPH circuit 180 will be notified by the short range object detection signal on node 184.

The threshold value on node 147 and the corresponding short range distance may be modified by VPH circuit 184 based on any criteria. For example, the threshold may be a function of IR laser pulse power, pulse duration, pulse density, wavelength, scanner speed, desired laser safety classification, and the like. The manner in which the threshold value is determined is not a limitation of the present invention.

VPH circuit 180 operates to manage accessible emission levels in a manner that allows overall operation to remain eye-safe. For example, in some embodiments, VPH circuit 180 controls whether a "short range pulse" or "long range pulse" is generated by setting a pulse energy value on node

185. The emitted pulse energy may be controlled by one or more of pulse power, pulse duration, or pulse count.

VPH circuit 180 may also control the timing of emitted pulses via the timing signal on node 157. In some embodiments, for every measurement point in the field of view, VPH circuit 180 signals pulse generation circuit 190 to generate a short range pulse that can detect objects with a very high level of confidence out to a distance sufficient to provide a virtual protective housing. As used herein, the term "short range pulse" refers to a pulse that is considered eye-safe at a very short range. For example, in some embodiments, the energy levels of the short range IR laser light pulses may be maintained below the IEC 60825.1 Class 1 Accessible Emissions Limit, such that short range IR laser light pulses can be emitted at every measurement point without risking injury to a human eye.

If an object is detected within the short range distance, the corresponding three-tuple (x,y,z) may be written to the 3D point cloud storage device 146, and system 100 provides a virtual protective housing by not emitting any higher energy pulses at that measurement point. If, however, a short range object is not detected, system 100 may emit one or more "long range pulses" that are of higher total energy to detect objects beyond the short range distance. For example, in some embodiments, system 100 may emit a short range IR laser light pulse that is considered eye-safe at a distance of 100 millimeters (mm) that has a 50% probability of detecting a 5% reflective target at 36 meters (m) in bright sunlight. This short range pulse may have a one in 10 billion probability of not detecting a 10% reflective target at a distance of 12 m. Also for example, system 100 may emit a long range pulse capable of detecting objects up to 200 m distant while remaining eye-safe beyond four meters distance. In this example, system 100 may emit short range pulses that have an extremely high probability of detecting objects within four meters, and then emit long range pulses that are capable of detecting objects at 200 m.

As used herein, the term "long range pulse" refers to one or more pulses with higher total energy than short range pulses. For example, in some embodiments, a single long range pulse may be emitted, and the single long range pulse may have higher energy than a single short range pulse, and in other embodiments, multiple long range pulses may be emitted, and the total energy of the multiple long range pulses may be higher than the single short range pulse.

Virtual protective housing circuit 180 may be implemented using any suitable circuit structures. For example, in some embodiments, VPH circuit 180 may include one or more finite state machines implemented using digital logic to respond to short range object detection and conditionally signal pulse generation circuit 190 to emit long range pulses. Further, in some embodiments, VPH circuit 180 may include a processor and memory to provide software programmability of short range pulse energy, long range pulse energy, threshold values and the like. The manner in which VPH circuit 180 is implemented is not a limitation of the present invention.

Figure 2:
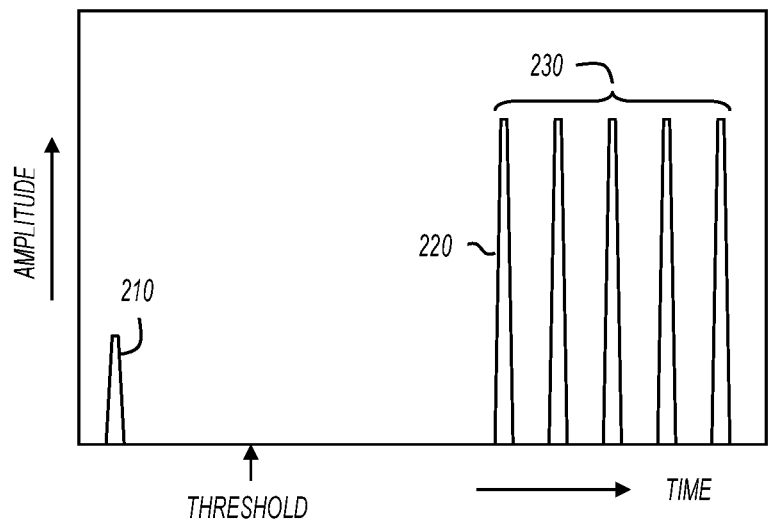
FIG. 2 shows short and long range pulses in accordance with various embodiments of the present invention.

FIG. 2 shows short and long range pulses in accordance with various embodiments of the present invention. Short range pulse 210 and long range pulses 230 are examples of IR laser light pulses that may be emitted by a LIDAR system at each measurement point. For example, LIDAR system 100 may emit short range pulse 210 and then conditionally emit one or more of long range pulses 230 based on whether a short range object is detected. Pulse amplitude is shown on the vertical axis and time is shown on the horizontal axis of the plot in FIG. 2. Short range pulse 210 is shown being emitted at a first time and a threshold is shown representing a second time. The difference between the first and second times represents the short range distance. For example, in some embodiments, the threshold is set at approximately 33 nanoseconds (ns) corresponding to a short range distance of substantially five meters. In some embodiments, short range pulse 210 has an energy level that is considered eye-safe at a very short distance. For example, short range pulse 210 may be eye-safe at 100 mm from the LIDAR system from which it is emitted.

In some embodiments, if a short range object is detected, the LIDAR system does not emit any long range pulses for that measurement point, and the detected distance is written to the 3D point cloud. On the other hand, if a short range object is not detected, one or more long range pulses 230 is emitted in a manner that maintains accessible emissions at an eye-safe level. For example, short range pulse 210 may have an energy level that provides a very high probability of detecting an object within the short range distance, and long range pulse 220 may have a total energy level that is eye-safe at the short range distance and beyond. Long range pulses can follow shortly after the threshold time if no short range object is detected. For example, long range pulse 220 may be emitted within 100 ns of the threshold time, or at 133 ns. The times corresponding to the threshold and emission of long range pulses may be different in various embodiments based on the desired short range distance and processing times, and are not a limitation of the present invention.

In some embodiments, a single long range pulse 220 is emitted, and in other embodiments a train of long range pulses 230 is emitted for each measurement point. The number of long range pulses emitted at a single measurement point is not a limitation of the present invention. For example, in some embodiments, a single long range pulse may be emitted, where the single long range pulse has a higher energy than the short range pulse. Also for example, in some embodiments, multiple long range pulses may be emitted, and each long range pulse may have an energy level that is the same as the short range pulse, but the total energy of the multiple long range pulses is greater than the energy of the short range pulse.

Any number of pulses at any energy level may be employed to define multiple ranges. For example, a short range may be defined by the energy of a single short range pulse. Also for example, a medium range may be defined by multiple pulses, each having the same energy as the short range pulse, and a long range may be defined by one or more long range pulses with the same or greater energy as the short range pulse.

In some embodiments, a short range pulse is emitted at every measurement point, and in other embodiments, short range pulses are not emitted at every measurement point. For example, a short range pulse may be emitted at a first measurement point, and if a short range object is not detected, then long range pulses may be emitted at one or more subsequent measurement point without first emitting a short range pulse. This is possible in some embodiments, in part, because measurement points may be defined sufficiently close to one another to enable a valid assumption that when no short range object occupies a measurement point, no short range object occupies some number of subsequent measurement points.

Figure 3:
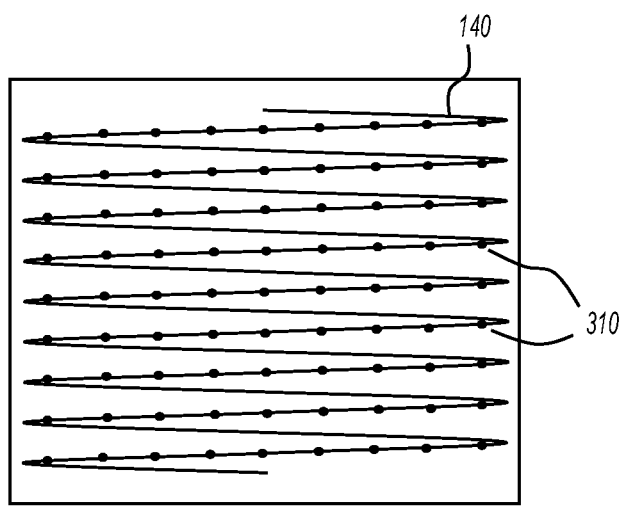
FIG. 3 shows measurement points in a field of view in accordance with various embodiments of the present invention.

FIG. 3 shows measurement points in a field of view in accordance with various embodiments of the present invention. Measurement points 310 are points on raster scan trajectory 140 at which the LIDAR system measures distance. For example, in some embodiments, a LIDAR system such as LIDAR system 100 (FIG. 1) emits a short range pulse at each measurement point 310 to detect if an object is within the short range distance and then conditionally emit one or more long range pulses as described above.

The term "measurement point" as used herein, is not meant to designate an infinitely small point in space, but rather a small and finite continuous section of raster scan trajectory 140. For example, the controlled output beam 134 (FIG. 1) traverses a finite section of raster scan trajectory 140 during the round trip transit times of a short range pulse and long range pulse at each measurement point. The measurement point area is also a function of laser spot size (initial size and divergence) at the distance where it encounters an object. Accordingly, the "measurement point" encompasses an area, albeit very small, and the size and location of the area may be a function of many factors.

Figure 4:
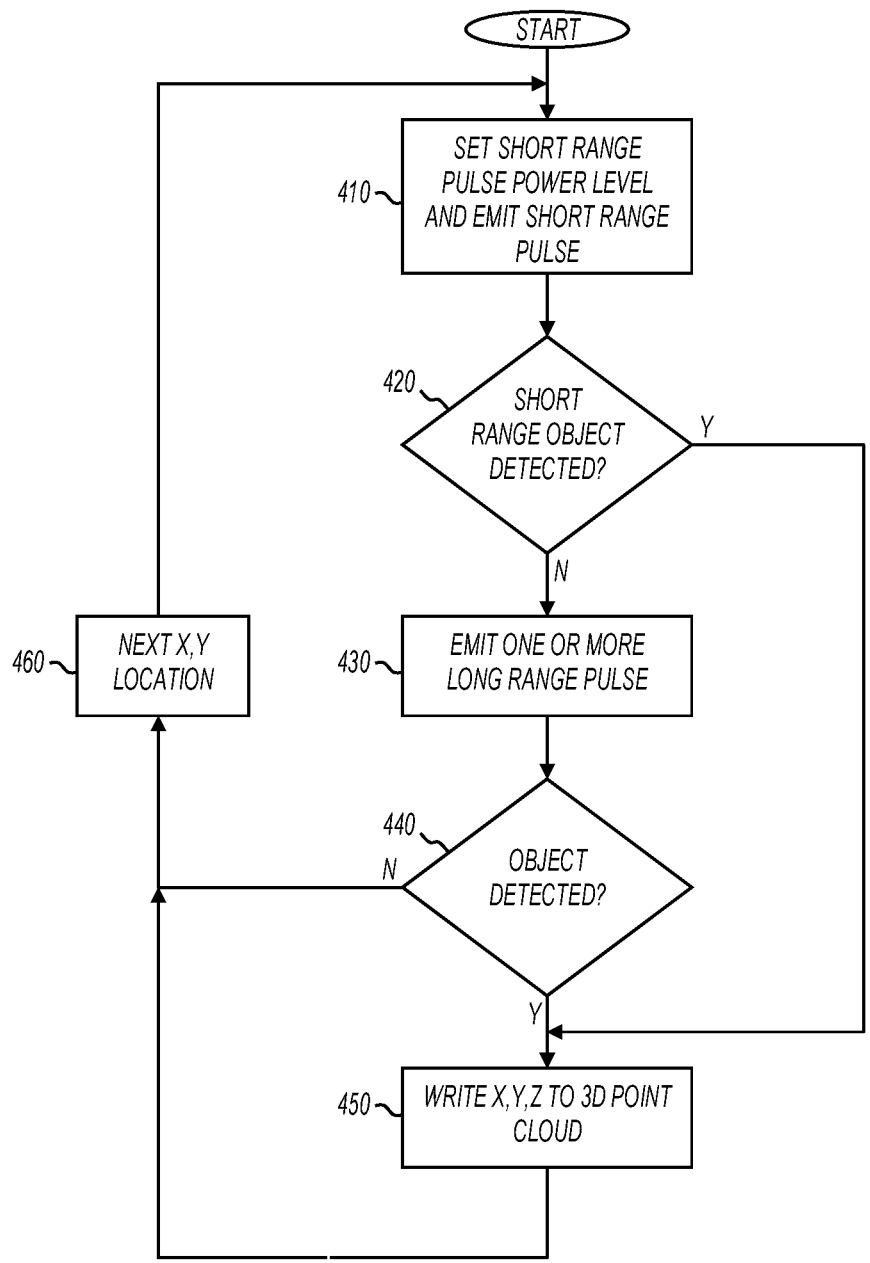
FIG. 4 shows a flow diagram of methods in accordance with various embodiments of the present invention.

FIG. 4 shows a flow diagram of methods in accordance with various embodiments of the present invention. In some embodiments, method 400, or portions thereof, is performed by a LIDAR system, embodiments of which are shown in previous figures. In other embodiments, method 400 is performed by a series of circuits or an electronic system. Method 400 is not limited by the particular type of apparatus performing the method. The various actions in method 400 may be performed in the order presented, or may be performed in a different order. Further, in some embodiments, some actions listed in FIG. 4 are omitted from method 400.

Method 400 is shown beginning with block 410 in which a short range pulse energy level is set and the short range pulse is emitted. In some embodiments, this corresponds to setting a pulse energy level to a value that will result in eye-safe operation at a particular distance from the LIDAR system. For example, in some embodiments, a short range pulse energy level may be set by virtual protective housing circuit 180 (FIG. 1) such that accessible emissions result in eye-safe operations at 100 mm, and in other embodiments, the pulse energy level may be set such that accessible emissions result in eye-safe operations at a minimum distance greater than 100 mm.

If a short range object is detected at 420, then a 3D point (X,Y,Z) may be written to a 3D point cloud storage device such as 3D storage device 146 (FIG. 1). If a short range object is not detected, then one or more long range pulses may be transmitted at 440. As described above, short range object detection may be accomplished by detecting a reflection of the short rang pulse, measuring the time-of-flight of the detected reflection, and comparing that time-of-flight to a threshold. The value of the threshold corresponding to the short range distance may be set to any suitable value.

At 430, one or more long range pulses are emitted. If an object is detected at 440, then a 3D point (X,Y,Z) may be written to a 3D point cloud storage device such as 3D storage device 146 (FIG. 1) and processing continues at the next measurement point at 460. If an object is not detected, then processing continues at the next measurement point at 460 without writing a 3D point to the point cloud storage device.

Figure 5:
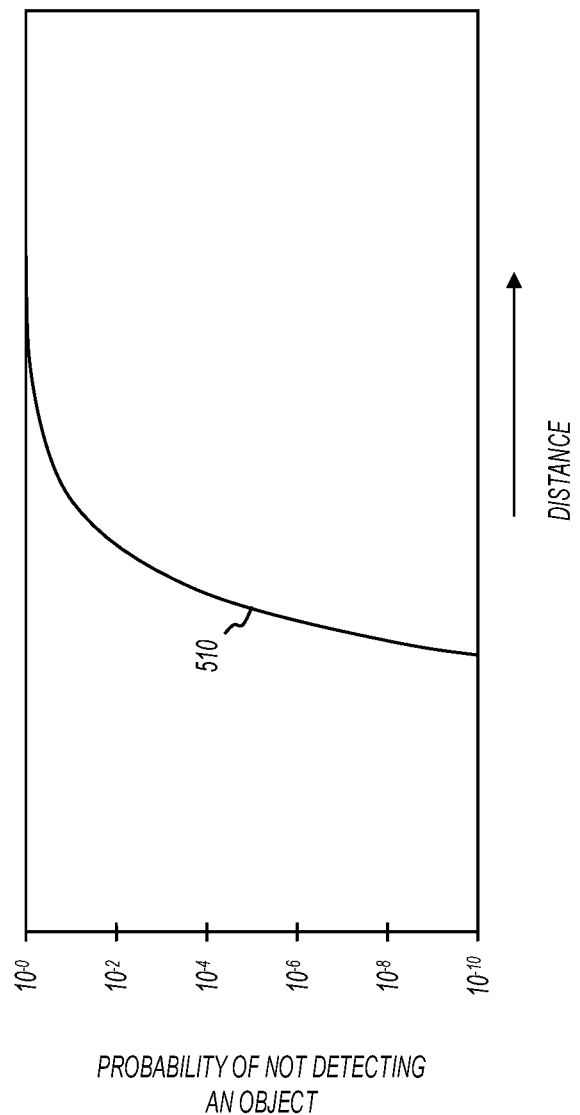
FIG. 5 shows a probability of not detecting an object as a function of distance in accordance with various embodiments of the present invention.

FIG. 5 shows a probability of not detecting an object as a function of distance in accordance with various embodiments of the present invention. Probability curve 510 is a typical curve that may shift left or right based on many parameters including pulse energy level, reflectivity of the object, ambient light, etc. For example, in extremely bright sunlight, a short range pulse that is eye-safe at 100 mm may have 10-10 probability of not detecting an object with a 20% reflectivity at 20 m. This results in an even lower probability of not detecting an object at closer distances, so in this same scenario, a long range pulse that is eye-safe at 5 m provides a very robust virtual protective housing.

In some embodiments, the threshold corresponding to the short range distance and the energy level of the long range pulse(s) are set to values that result in the short range distance and the minimum eye-safe distance of the long range pulse(s) being equal. In other embodiments, the threshold corresponding to the short range distance and the energy level of the long range pulse(s) are set to values that result in the short range distance being greater than minimum eye-safe distance of the long range pulse(s).

Figure 6:
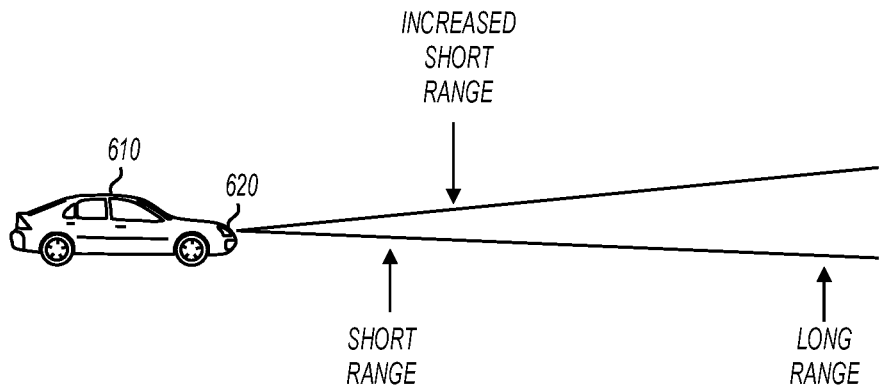
FIG. 6 shows a moving platform with an eye-safe LIDAR system in accordance with various embodiments of the present invention.

FIG. 6 shows a moving platform with an eye-safe LIDAR system in accordance with various embodiments of the present invention. Automobile 610 is a platform upon which an eye-safe LIDAR system 620 is mounted. In some embodiments, eye-safe LIDAR system 620 is implemented using LIDAR system 100 (FIG. 1) or any of the LIDAR systems discussed further below.

In some embodiments, the energy of short range pulses is increased when the platform upon which the LIDAR system is mounted is in motion. For example, when automobile 610 has a velocity above a threshold, the energy of short range pulses may have a level that results in accessible emissions eye-safe level at a minimum distance above 100 mm. In some embodiments, the minimum distance at which the accessible emissions result in eye-safe level may be a meter or more. Also for example, the energy of short range pulses may be increased with increased platform velocity. In some embodiments, the energy of short range pulses may be gradually increased as the platform accelerates between 2.5 meters per second (m/s) and 25 m/s.

Increasing the energy level of short range pulses may result in increased probability of detecting objects within the short range and/or increasing the short range within which objects can be detected. FIG. 6 shows an increased short range as a result of increased short range pulse energy.

Figure 7:
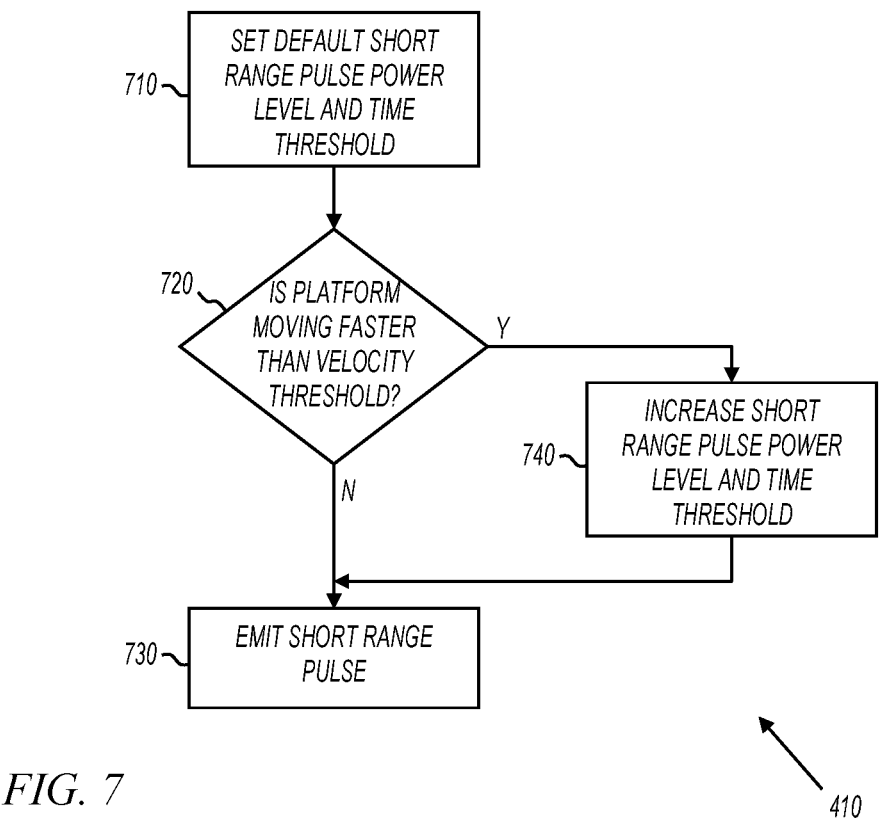
FIG. 7 shows a flow diagram of methods in accordance with various embodiments of the present invention.

FIG. 7 shows a flow diagram of methods in accordance with various embodiments of the present invention. In some embodiments, method 410, or portions thereof, is performed by a LIDAR system, embodiments of which are shown in previous figures. In other embodiments, method 410 is performed by a series of circuits or an electronic system. For example, method 410 may be performed by a virtual protective housing circuit. Method 410 is not limited by the particular type of apparatus performing the method. The various actions in method 410 may be performed in the order presented, or may be performed in a different order. Further, in some embodiments, some actions listed in FIG. 7 are omitted from method 410.

Method 410 corresponds to block 410 of FIG. 4. Method 410 is shown beginning with block 710 in which a default short range pulse energy level and a default time threshold are set. In some embodiments, the short range pulse energy level is set such that the accessible emissions are eye-safe at a short distance (e.g., 100 mm or less), and the time threshold is set to a value that provides a very low probability of not detecting an object (see FIG. 5).

At 720, if a velocity is faster than a threshold, processing continues at 740, and if a velocity is not faster than a threshold, processing continues at 730. In some embodiments, the velocity corresponds to the velocity of a moving platform upon which the LIDAR system is mounted. For example, if the LIDAR system is mounted on an automobile, the velocity corresponds to the speed of the automobile. In some embodiments, the LIDAR system receives velocity information from the automobile, and in other embodiments, the LIDAR system includes a velocity sensor and does not rely on an external source of velocity information.

At 740, the short range pulse energy level and the time threshold corresponding to the short range distance are increased. In some embodiments, the short range pulse energy is increased to a level that results in accessible emissions that result in eye-safe levels at a minimum distance of one meter. In other embodiments, the short range pulse energy is increased to a level that results in accessible emissions that result in eye-safe levels at a minimum distance greater than or less than one meter. At 730, the short range pulse is emitted.

Figure 8:
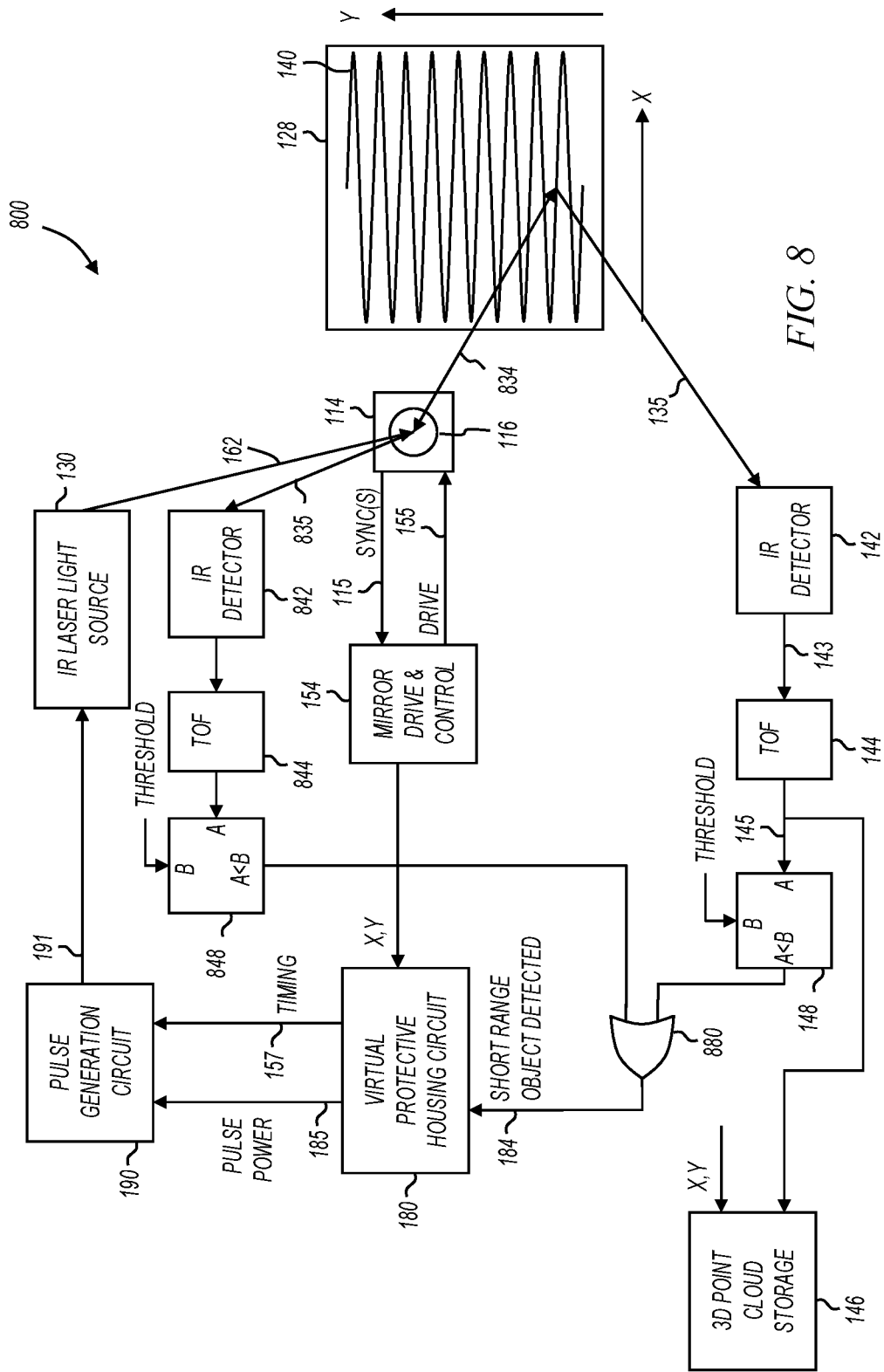
FIGS. 8 and 9 shows a scanning light detection and ranging (LIDAR) system with a virtual protective housing and redundant detectors in accordance with various embodiments of the present invention.
Figure 9:
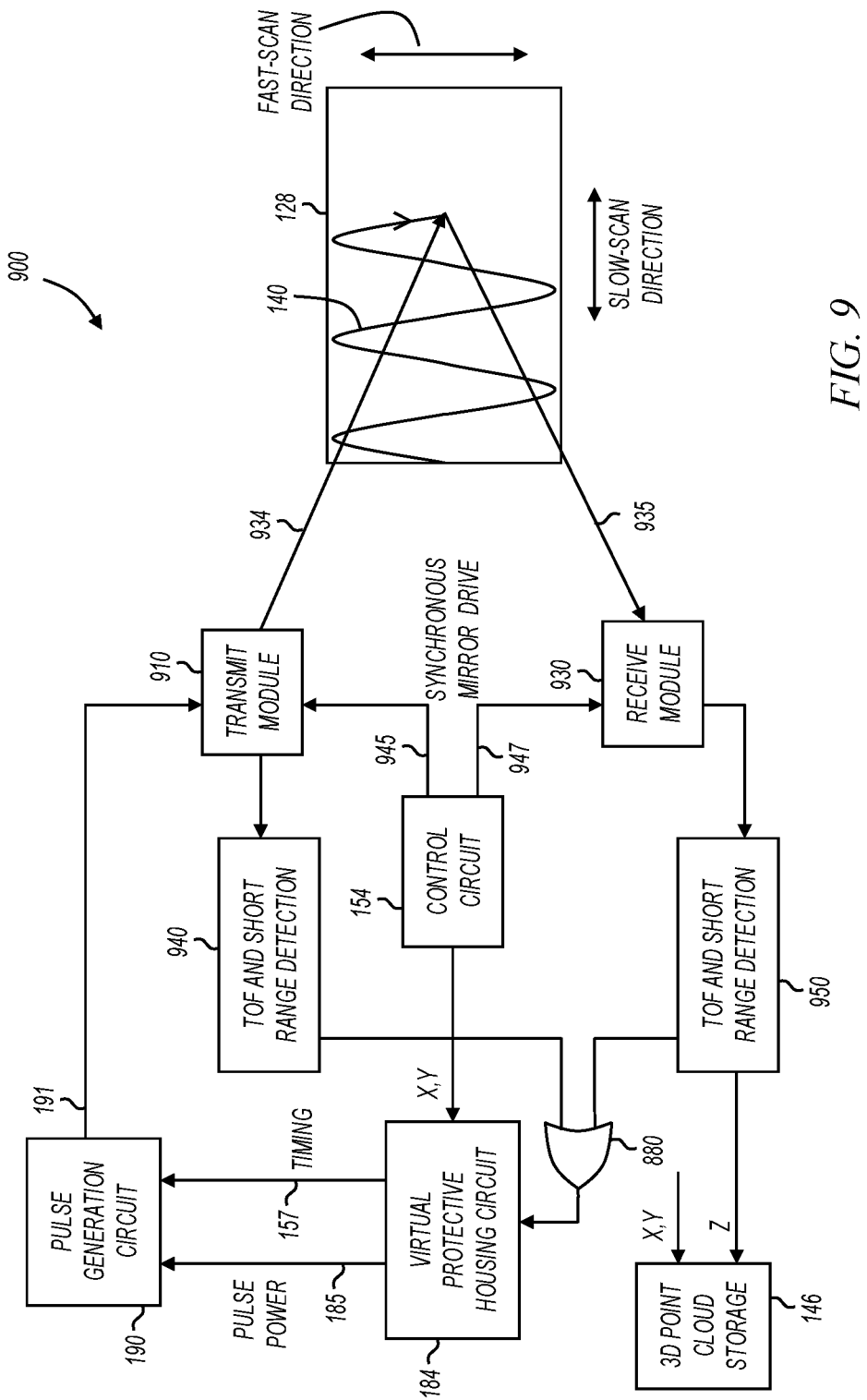

FIGS. 8 and 9 show scanning light detection and ranging (LIDAR) systems with a virtual protective housing and redundant detectors in accordance with various embodiments of the present invention.

Referring to FIG. 8, LIDAR system 800 includes all of the components of LIDAR system 100 (FIG. 1), and also includes a second IR detector 842, second TOF circuit 844, second comparator 848, and OR gate 880. In operation, the additional circuits provide a redundant short range object detection capability, and OR gate 880 will signal the detection of a short range object if either circuit detects a short range object.

Redundant short range object detection provides an additional measure of safety. For example, if one or the IR detectors, TOF circuits, or comparators should fail, the redundancy will ensure continued safe operation.

In some embodiments, IR detector 142 and second IR detector 842 receive reflected light through different optical paths. For example, IR detector 142 may receive reflected light along a path shown at 135 and IR detector 835 may share an optical path with the emitted light pulses. In embodiments represented by FIG. 8, emitted IR laser light at 162 is reflected by mirror 116 to produce light pulses along path 834, and any reflected light along path 834 will also be reflected by mirror 116 and reach IR detector 842 along path 835.

In some embodiments, both of the detection and TOF circuits operate to detect short range objects, and only one of the detection and TOF circuits operate to measure long range distance and/or write to the 3D cloud storage device. For example, in embodiments represented by FIG. 8, times-of-flight measured by either TOF circuit 844 or TOF circuit 144 may be used to detect a short range object, but only times-of-flight measured by TOF circuit 144 are used to populate the 3D point cloud.

Referring now to FIG. 9, LIDAR system 900 includes VPH circuit 184, pulse generation circuit 190, 3D point cloud storage device 146, OR gate 880, and control circuit 154. LIDAR system 900 also includes transmit module 910, receive module 930, TOF and short range detection circuits 940, and TOF and short range circuits 950.

Each of TOF and short range detection circuits 940 and 950 include a TOF circuit and comparator. For example, TOF and short range detection circuits 940 may include TOF circuit 844 and comparator 848 (FIG. 8), and TOF and short range detection circuits 950 may include TOF circuit 144 and comparator 148 (FIG. 8).

Transmit module 910 includes an IR laser light source to produce a pulsed laser beam, collimating and focusing optics, and one or more scanning mirror assemblies to scan the pulsed laser beam in two dimensions in the field of view. Transmit module 910 also includes an IR laser light detector that shares an optical path with emitted IR laser light pulses. Example embodiments of transmit modules are described more fully below with reference to later figures.

Receive module 930 includes optical devices and one or more scanning mirror assemblies to scan in two dimensions to direct reflected light from the field of view to an included IR light detector. Example embodiments of receive modules are described more fully below with reference to later figures.

Control circuit 154 controls the movement of scanning mirrors within transmit module 910 as described above with reference to FIG. 1. Control circuit 154 also controls the movement of scanning mirrors within receive module 930. In operation, control circuit 140 receives mirror position feedback information (not shown) from transmit module 910, and also receives mirror position feedback information (not shown) from receive module 930. The mirror position feedback information is used to phase lock the operation of the mirrors. Control circuit 540 drives microelectromechanical (MEMS) assemblies with scanning mirrors within transmit module 910 with drive signal(s) 945 and also drives MEMS assemblies with scanning mirrors within receive module 930 with drive signal(s) 947 that cause the mirrors to move through angular extents of mirror deflection that define the size and location of field of view 128. The synchronization of transmit and receive scanning allows the receive aperture to only accept photons from the portion of the field of view where the transmitted energy was transmitted. This results in significant ambient light noise immunity.

As shown in FIG. 9, the two dimensional scanning is performed in a first dimension (vertical, fast scan direction) and a second dimension (horizontal, slow scan direction). The labels "vertical" and "horizontal" are somewhat arbitrary, since a 90 degree rotation of the apparatus will switch the horizontal and vertical axes. As an example, the fast and slow scan directions are shown in FIG. 9 having a 90 degree rotation as compared to those shown in FIGS. 1 and 8.

Figure 10:
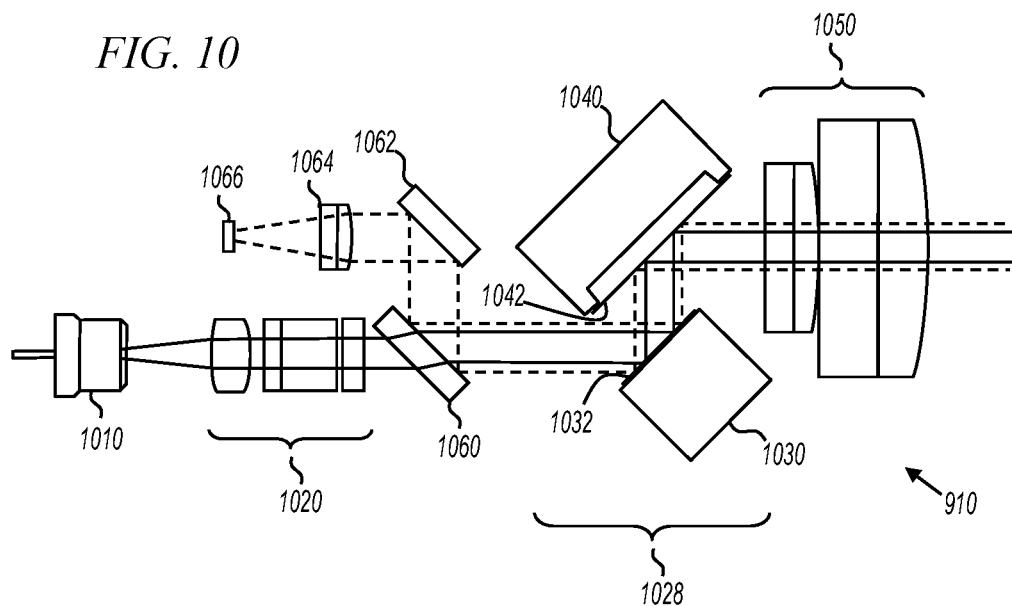
FIG. 10 shows a side view of a transmit module in accordance with various embodiments of the present invention.
Figure 11:
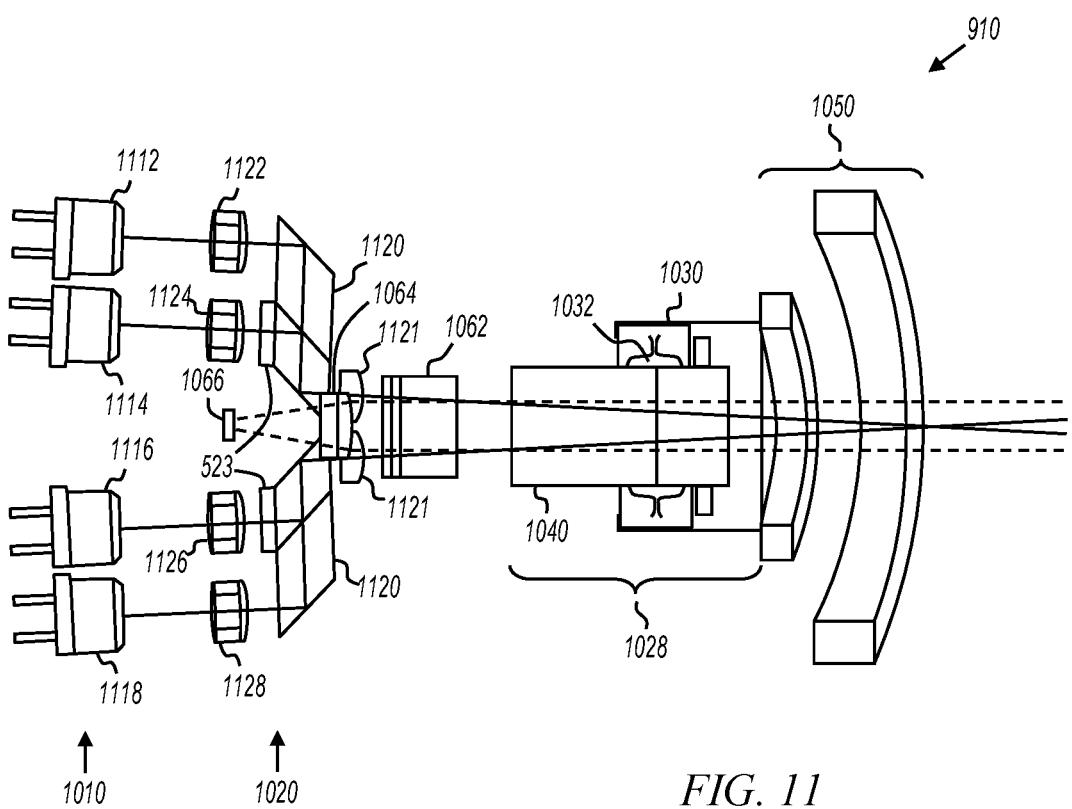
FIG. 11 shows a top view of a transmit module in accordance with various embodiments of the present invention.

FIG. 10 shows a side view and FIG. 11 shows a top view of a transmit module in accordance with various embodiments of the present invention. Transmit module 910 includes laser light source 1010, beam shaping optical devices 1020, received energy pickoff device 1060, mirror 1062, beam shaping device 1064, IR detector 1066, scanner 1028, and exit optical devices 450.

In some embodiments, laser light source 1010 sources nonvisible light such as infrared (IR) light. In these embodiments, IR detector 1066 detects the same wavelength of nonvisible light, as does an IR detector in receive module 930 (FIG. 9). For example, in some embodiments, light source 1010 may include a laser diode that produces infrared light with a wavelength of substantially 905 nanometers (nm), and IR detector 1066 detects reflected light pulses with a wavelength of substantially 905 nm. Also for example, in some embodiments, light source 1010 may include a laser diode that produces infrared light with a wavelength of substantially 940 nanometers (nm), and IR detector 1066 detects reflected light pulses with a wavelength of substantially 940 nm. The wavelength of light is not a limitation of the present invention. Any wavelength, visible or nonvisible, may be used without departing from the scope of the present invention.

Laser light source 1010 may include any number or type of emitter suitable to produce a pulsed laser beam. For example, in some embodiments, laser light source 1010 includes multiple laser diodes shown in FIG. 11 at 1112, 1114, 1116, and 1118. The pulsed laser light produced by laser light source 1010 is combined, collimated, and focused by beam shaping optical devices 1020 to produce a pulsed laser beam. For example, optical devices 1022 may collimate the laser beams on the fast axis, polarization rotators 1023 and beam combiners 1020 may combine laser beams, and optical devices 1022 may form the pulsed laser beam into a fan on the slow axis. Beam sizes and divergence values are not necessarily uniform across the various embodiments of the present invention; some embodiments have higher values, and some embodiments have lower values.

Scanner 1028 receives the pulsed laser beam from optical devices 1020 and scans the pulsed beam in two dimensions. In embodiments represented by FIGS. 10 and 11, scanner 1028 includes two separate scanning mirror assemblies 1030, 1040, each including a scanning mirror 1032, 1042, where each scanning mirror scans the beam in one dimension. For example, scanning mirror 1032 scans the pulsed beam in the fast scan direction, and scanning mirror 1042 scans the pulsed beam in the slow scan direction.

Although scanner 1028 is shown including two scanning mirror assemblies, where each scans in a separate dimension, this is not a limitation of the present invention. For example, in some embodiments, scanner 1028 is implemented using a single biaxial scanning mirror assembly that scans in two dimensions. In some embodiments, scanning devices uses electromagnetic actuation, achieved using a miniature assembly containing a MEMS die and small subassemblies of permanent magnets and an electrical interface, although the various embodiments are not limited in this respect.

Exit optical devices 1050 operate on the scanning pulsed laser beam as it leaves the transmit module. In some embodiments, exit optical devices 1050 perform field expansion. For example, scanning mirror assembly 1028 may scan through maximum angular extents of 20 degrees on the fast scan axis, and may scan through maximum angular extents of 40 degrees on the slow scan axis, and exit optical devices 1050 may expand the field of view to 30 degrees on the fast scan axis and 120 degrees on the slow scan axis. The relationship between scan angles of scanning mirrors and the amount of field expansion provided by exit optical devices 1050 is not a limitation of the present invention.

Received energy pickoff device 1060 deflects received light (shown as a dotted line) that shares the transmit optical path with the emitted light pulses (shown as a solid line). The deflected received light is then reflected by mirror 1062, focused by optical device 1064, and detected by IR detector 1066. In some embodiments, pickoff device 1060 includes a "window" that transmits the pulsed beam produced by the IR laser light source, and a reflective outer portion to deflect received energy outside the window. In other embodiments, pickoff device 1060 is a partial reflector that transmits a portion of incident light and reflects the rest. For example, a reflector that transmits 90% of incident light and reflects 10% of incident light will provide the IR detector with 10% of the light reflected off an object in the field of view. In still further embodiments, pickoff device 1060 may incorporate a polarizing beam splitter that transmits the pulsed laser beam (at a first polarization), and picks off received light of a different polarization. This is effective, in part, due to the reflections being randomly polarized due to Lambertian reflection. In still further embodiments, the outgoing laser beam and received energy may be directed to different portions of the scanning mirrors, and pickoff device 1060 may be an offset mirror positioned to reflect one but not the other.

IR detector 1066 may be an example embodiment of IR detector 842 (FIG. 8). For example, in some embodiments, transmit module 930 implements the transmit side (with redundant IR detector) of LIDAR system 800.

Figure 12:
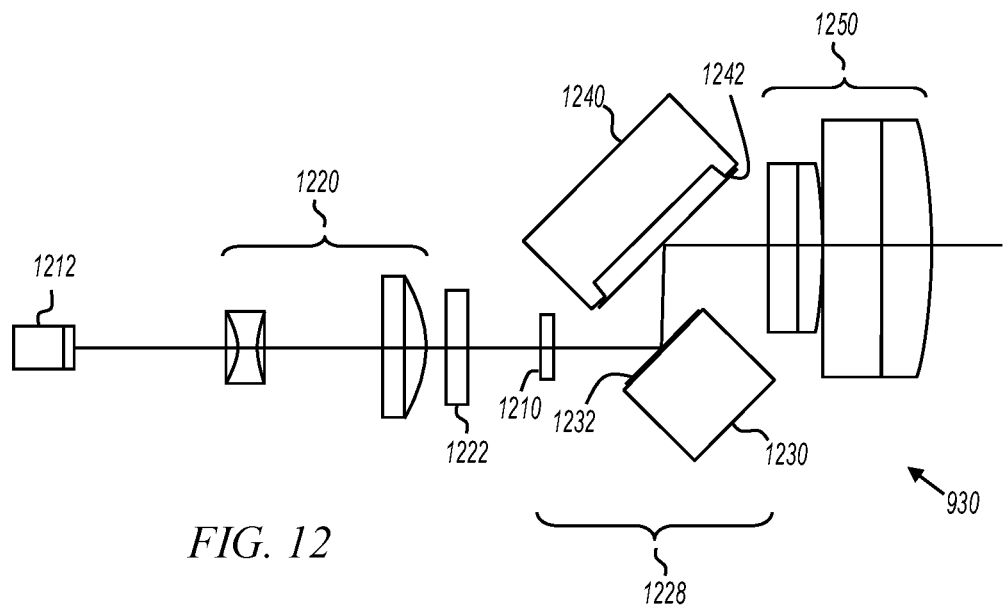
FIG. 12 shows a side view of a receive module in accordance with various embodiments of the present invention.
Figure 13:
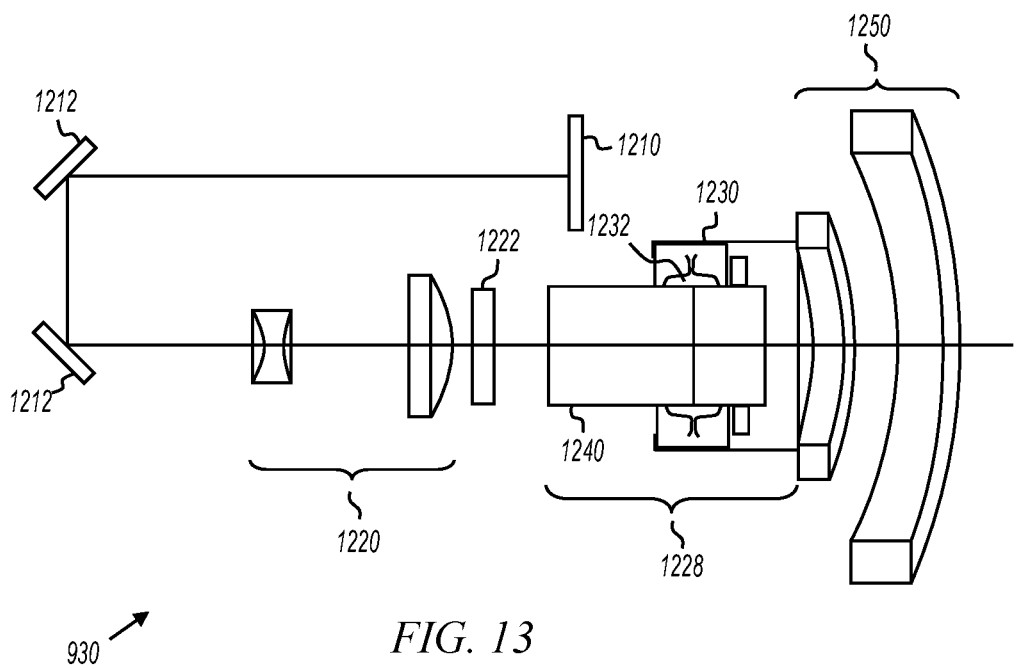
FIG. 13 shows a top view of a receive module in accordance with various embodiments of the present invention.

FIG. 12 shows a side view and FIG. 13 shows a top view of a receive module in accordance with various embodiments of the present invention. Receive module 930 includes IR detector 1210, fold mirrors 1212, imaging optical devices 1220, bandpass filter 1222, scanner 1228, and exit optical devices 1250.

Scanning mirror assemblies 1230 and 1240 are similar or identical to scanning mirror assemblies 1030 and 1040, and exit optical devices 1250 are similar or identical to exit optical devices 1050. Bandpass filter 1222 passes the wavelength of light that is produced by laser light source 1010, and blocks ambient light of other wavelengths. For example, in some embodiments, the laser light source produces light at 905 nm, and bandpass filter 1222 passes light at 905 nm.

Imaging optical devices 1220 image a portion of the field of view onto IR detector 1210 after reflection by fold mirrors 1212. Because scanner 1228 is scanned synchronously with scanner 1028, arrayed receiver 1210 always collects light from the measurement points illuminated by the scanned pulsed beam.

Figure 14:
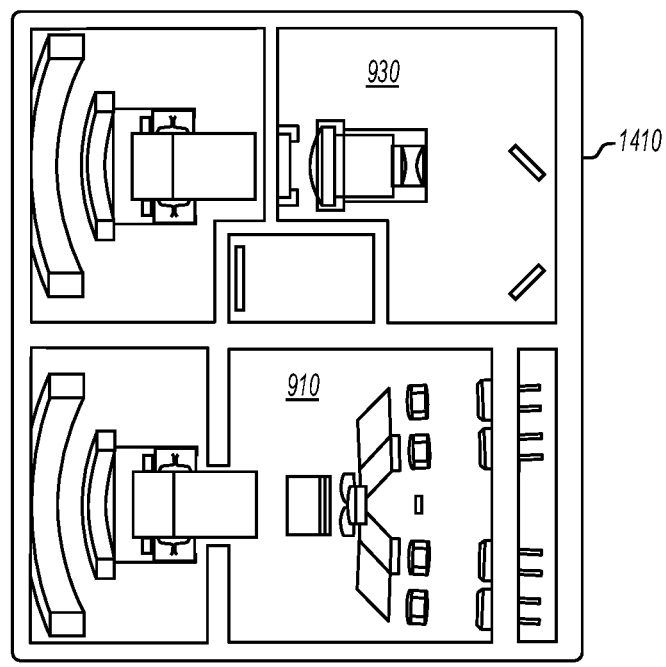
FIG. 14 shows a cross sectional top view of an integrated photonics module in accordance with various embodiments of the present invention.

FIG. 14 shows a cross sectional top view of an integrated photonics module in accordance with various embodiments of the present invention.

Integrated photonics module 1410 includes both transmit module 910 and receive module 930. In some embodiments, a photonics module include transmit module 910, and a receive module that does not include a separate scanning assembly. For example, a photonics module may implement the optical portions of LIDAR system 800 (FIG. 8) which includes a scanner on the transmit side that shares an optical path with an IR detector, and includes a receiver side without a separate scanner.

Figure 15:
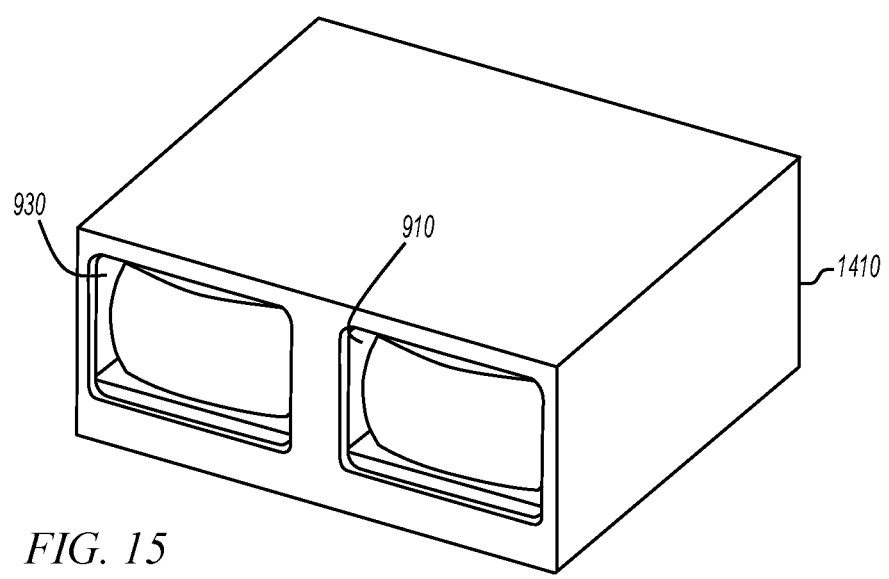
FIG. 15 shows a perspective view of the integrated photonics module of FIG. 14.

FIG. 15 shows a perspective view of the integrated photonics module of FIG. 14. Integrated photonics module 1410 is shown having a rectangular housing with transmit module 910 and receive module 930 placed side by side. In some embodiments, transmit module 910 and receive module 930 are placed one on top of the other. The relative orientation of transmit module 910 and receive module 930 is not a limitation of the present invention.

Figure 16:
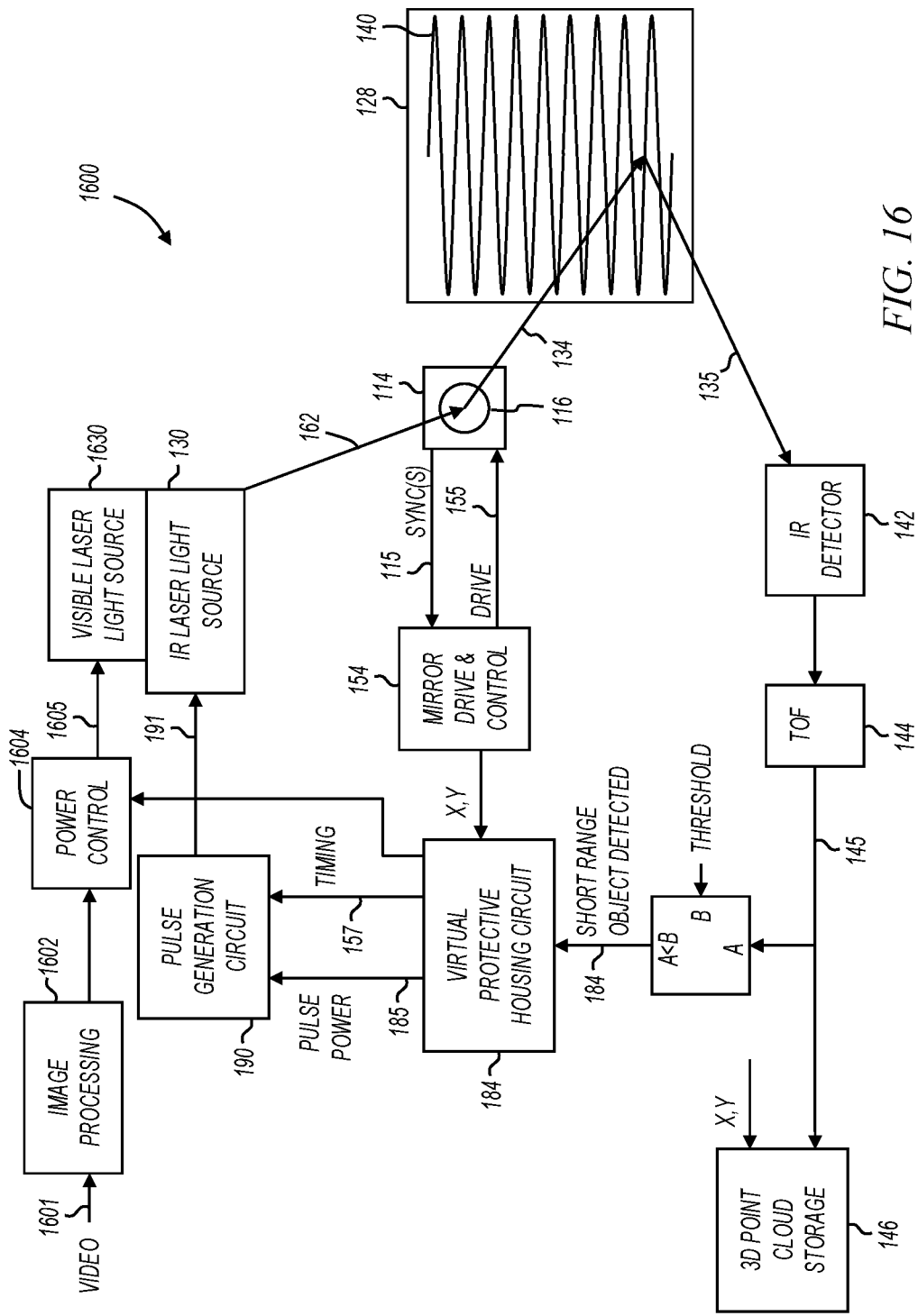
FIG. 16 shows a scanning projector with an eye-safe LIDAR system in accordance with various embodiments of the present invention.

FIG. 16 shows a scanning projector with an eye-safe LIDAR system in accordance with various embodiments of the present invention. Scanning projector 1600 includes all of the components shown in FIG. 1 and also includes image processing component 1602, power control circuit 1604, and visible laser light source 1630. In some embodiments, visible laser light source includes red, green, and blue laser light sources that are pulsed to create visible pixels that result in a viewable image in field of view 128.

Power control circuit 1604 is responsive to VPH circuit 184 to reduce power of visible laser light pulses when objects are detected in the field of view. For example, if a short range object is detected, power control circuit 1604 may blank the visible laser light or reduce power levels such that accessible emissions are eye-safe at the distance of the detected object.

Figure 17:
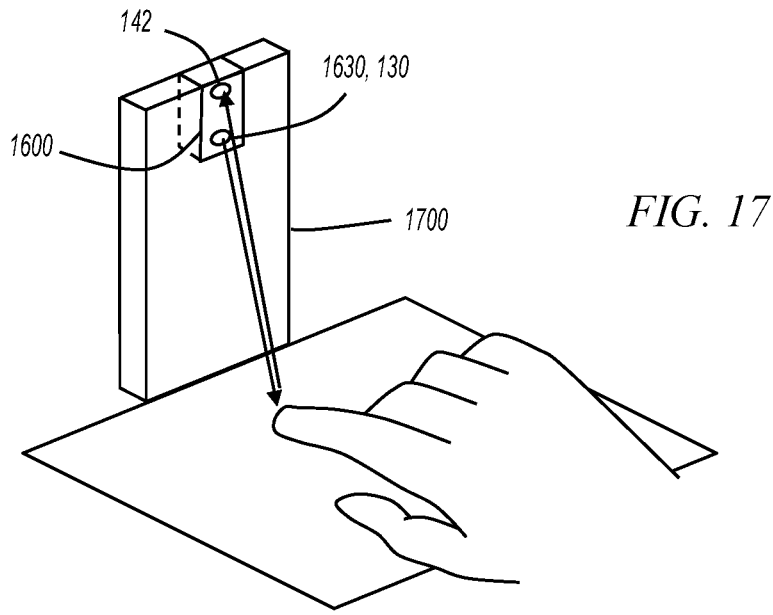
FIG. 17 shows an interactive display device in accordance with various embodiments of the present invention.

FIG. 17 shows an interactive display device in accordance with various embodiments of the present invention. Interactive display device 1700 includes scanning projector 1600, which in turn includes laser light sources 1630, 130 and IR detector 142. In some embodiments, interactive display device displays visible content and a user may interact through gesture recognition.

Figure 18:
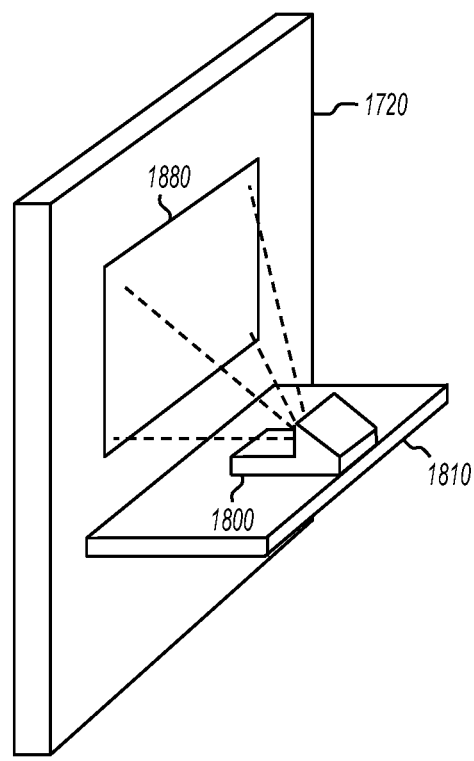
FIG. 18 shows a short throw projector in accordance with various embodiments of the present invention.

FIG. 18 shows a short throw projector in accordance with various embodiments of the present invention. Short throw projector 1800 is positioned on a shelf 1810 and projecting into field of view 1880 onto a wall 1720. Projector 1800 includes any virtual protective housing circuits described above.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. An apparatus comprising:
   a laser light source to produce infrared (IR) laser light pulses at multiple energy levels at times corresponding to a plurality of depth measurement points in a field of view;
   a scanning mirror assembly to scan the IR laser light pulses along a scan trajectory in the field of view;
   a first IR light detector to detect reflections of the IR laser light pulses from along the scan trajectory within the field of view;
   time-of-flight (TOF) circuitry responsive to the first IR light detector to measure distances to objects at the plurality of depth measurement points along the scan trajectory in the field of view;
   a comparator to compare the distances to a threshold corresponding to a short range to detect an object within the short range, wherein the threshold increases as a velocity of the apparatus increases; and
   a virtual protective housing circuit that, for each depth measurement point in the plurality of depth measurement points along the scan trajectory in the field of view, causes the laser light source to:
      emit a first IR laser light pulse having a total first energy for a depth measurement point in the plurality of depth measurement points along the scan trajectory; and
      responsive to the comparator not detecting an object within the short range with the first IR laser light pulse, emit at least one second IR laser light pulse having a total second energy to detect an object within a long range for the depth measurement point in the plurality of depth measurement points along the scan trajectory,
      wherein the total first energy is lower than the total second energy.

2. The apparatus of claim 1 further comprising:
   a second IR light detector; and
   second TOF circuitry responsive to the second IR light detector.

3. The apparatus of claim 2 further comprising:
   a first optical path between the scanning mirror assembly and the field of view;
   and a second optical path between the field of view and the first IR light detector, wherein the second IR light detector is positioned to receive light from the field of view through the first optical path.

4. The apparatus of claim 1 wherein the apparatus is mounted on a moving platform.

5. The apparatus of claim 4 wherein the total first energy is increased when the moving platform has a velocity above the threshold.

6. The apparatus of claim 4 wherein the total first energy increases with increased platform velocity.

7. The apparatus of claim 1 further comprising at least one visible laser light source to emit visible laser light, wherein the virtual protective housing circuit includes circuitry to reduce a power level of the visible laser light in response to the TOF circuitry.

8. An apparatus comprising:
   a first laser light source to emit IR laser light pulses at times corresponding to a plurality of measurement points in a field of view;
   a scanning mirror assembly to reflect the IR laser light pulses at the plurality of measurement points along a scan trajectory in the field of view,
   a first time-of-flight (TOF) measurement circuit to produce depth data representing distances to objects at the plurality of measurement points along the scan trajectory in the field of view in response to received reflections of the IR laser light pulses;
   a comparator to compare the distances to a threshold corresponding to a short range to detect an object within the short range, wherein the threshold increases as a velocity of the apparatus increases;
   pulse generation circuitry to, for each measurement point in the plurality of measurement points along the scan trajectory in the field of view:
      produce a first IR laser light pulse having a total first energy for a measurement point in the plurality of measurement points along the scan trajectory; and
      responsive to the comparator not detecting an object within the short range with the first IR laser light pulse, produce at least one second IR laser light pulse having a total second energy to detect an object within a long range for the measurement point in the plurality of measurement points along the scan trajectory, wherein the total first energy is lower than the total second energy; and
   a 3D point cloud storage device to store 3D depth map information.

9. The apparatus of claim 8 wherein the total first energy of the first IR laser light pulse is below an eye-safe threshold at a first distance, and the total second energy of the at least one second IR laser light pulse is below an eye-safe threshold at a second distance, where the second distance is greater than the first distance.

10. The apparatus of claim 9 wherein the apparatus is mounted on a moving platform.

11. The apparatus of claim 10 wherein the first distance is increased when the moving platform has a velocity above the threshold.

12. The apparatus of claim 10 wherein the first distance is increased based on a velocity of the moving platform.

13. The apparatus of claim 8 further comprising a second TOF measurement circuit, wherein the first and second TOF measurement circuits measure TOF of reflections received on different optical paths.

14. The apparatus of claim 8 further comprising:
   at least one visible laser light source to emit visible laser light; and
   circuitry to reduce a power level of the visible laser light in response to the first TOF measurement circuit.

15. A method comprising:
   for each of a plurality of measurement points along a scan trajectory in a field of view:
      generating a short range IR laser light pulse at a time corresponding to a measurement point in the plurality of measurement points along the scan trajectory in the field of view, the short range IR laser light pulse having a total first energy;

scanning the short range IR laser light pulse to the measurement point of the plurality of measurement points along the scan trajectory in the field of view;

determining if a detected reflection of the short range IR laser light pulse from the measurement point of the plurality of measurement points along the scan trajectory in the field of view indicates an object within a first distance, wherein the determining comprises comparing a measured time-of-flight (TOF) of the short range IR laser light pulse to a threshold;

increasing the threshold as a velocity of an apparatus performing the method increases;

responsive to not detecting an object within the first distance with a detected reflection of short range IR laser light pulse, generating and scanning at least one long range IR laser light pulse to the measurement point in the plurality of measurement points along the scan trajectory to detect an object within a second distance, the at least one long range IR laser light pulse having a total second energy, wherein the total first energy is less than the total second energy, and wherein the first distance is less than the second distance; and storing time-of-flight of any received reflection of the at least one long range IR laser light pulse as depth data in a 3D point cloud storage device.

16. The method of claim 15 wherein the short range IR laser light pulse is eye-safe at the first distance.

17. The method of claim 16 wherein the at least one long range IR laser light pulse is eye-safe beyond the first distance.

18. The method of claim 15 further comprising increasing the total first energy the short range IR laser light pulse when the laser light pulses are emitted from a moving platform.

19. The method of claim 15 wherein the at least one long range IR laser light pulse comprises a plurality of long range IR laser light pulses.

20. The method of claim 15 further comprising:

scanning visible laser light pulses to form an image in the field of view; and reducing power of the visible laser light pulses when the detected reflection of the short range IR laser light pulse from the measurement point of the plurality of measurement points along the scan trajectory in the field of view indicates an object within the first distance.

* * * * *